United States Patent [19]

Weible et al.

[11] Patent Number: 5,272,125
[45] Date of Patent: Dec. 21, 1993

[54] METHOD OF MAKING A WASHCOAT MIXTURE AND CATALYST FOR TREATMENT OF DIESEL EXHAUST

[75] Inventors: Glen P. Weible, Davison; Richard F. Beckmeyer, Clarkston, both of Mich.

[73] Assignee: General Motors Corporation, Detroit, Mich.

[21] Appl. No.: 982,533

[22] Filed: Nov. 27, 1992

[51] Int. Cl.$^5$ .................. B01J 21/06; B01J 21/08; B01J 23/64; B01J 32/00
[52] U.S. Cl. .................................. 502/242; 502/439
[58] Field of Search ................ 502/242, 439; 423/215.5

[56] References Cited

U.S. PATENT DOCUMENTS 4,459,372  7/1984  Arena ........................ 502/351
4,929,586  5/1990  Hegedus et al. ............ 502/217
5,157,007  10/1992 Domesle et al. ............ 502/66

OTHER PUBLICATIONS

T. Shikada et al, Ind. Eng. Chem. Prod. Res. Dev., vol. 20, No. 1, pp.: 91-95, 1981.
C. U. Odenbrand et al, Appl. Catalysis, 18, pp.: 335-336, 1985.
E. T. C. Vogi et al, Journal of Catalysis 114, pp.: 313-314, 1988.

Primary Examiner—W. J. Shine
Attorney, Agent, or Firm—George A. Grove

[57] ABSTRACT

A catalyst support is formed from powders of silica, titania and vanadia and optionally a silicate-based clay by applying a wet mixture of such powders to a support substrate and drying and calcining. When impregnated with platinum or palladium, the catalyst support reduces hydrocarbon and particulate emission in diesel exhaust and also prevents formation of mutagens in the exhaust. Advantageously, the catalyst support minimizes reaction with sulfur.

12 Claims, 1 Drawing Sheet

METHOD OF MAKING A WASHCOAT MIXTURE AND CATALYST FOR TREATMENT OF DIESEL EXHAUST

FIELD OF THE INVENTION

This invention relates to a catalytically active washcoat for a catalytic converter. More particularly, it relates to such washcoats having significantly less reaction with sulfur compounds and having improved ability to reduce particulate emission when applied to diesel engine exhaust gas washcoat supports.

BACKGROUND OF THE INVENTION

Exhaust emissions from a hydrocarbon-fueled engine, such as in an automotive vehicle, are treated in a catalytic converter which has exhaust gas contacting surfaces. The gas contacting surfaces are defined by longitudinal exhaust flow passages (cells) in a metal or ceramic support member such as an extruded ceramic (cordierite) or corrugated metal monolith. A washcoat layer of refractory oxide carrying catalytic metal is retained on the surfaces of the passages. Very fine catalytic metal is dispersed on fine (micron size) particles of refractory oxide, such as alumina. As exhaust gases pass through passages of the monolith, the catalytic metal carried by the washcoat promotes oxidation of unburned or partially oxidized hydrocarbons and carbon monoxide and promotes the reduction of nitrogen oxides. Noble metals such as platinum and palladium are used in treatment of auto exhaust due to their durability at high temperatures. In the case of diesel engines, it is necessary to treat diesel particulates which are typically on the order of 0.1 micron in diameter and contain a solid, carbonaceous portion and a soluble organic portion. Diesel particulate can be collected and removed from an exhaust gas stream by various types of filters or traps. This approach is technically difficult and costly.

It is desirable to treat diesel particulate by continuous catalytic combustion of particulate in the exhaust gas stream over a catalyst in a catalytic converter, in a method similar to the treatment of gaseous hydrocarbon emissions. Converters using support members coated with alumina have been evaluated for this purpose. However, such alumina washcoats promote an undesirable reaction with sulfur which is present in a relatively large amount in diesel fuels as compared to gasoline. Combinations of oxides which include alumina, such as alumina-titania-vanadia mixtures, are also not favored.

Silicas have been used in washcoats but have not been favored for use with vehicle engines operated at high temperatures due to the relatively low thermal stability of silica and the undesired reaction of sulfur with platinum supported on silica. Silica supports doped with metal oxides including $TiO_2$ and $V_2O_5$ have been used for reaction of nitric oxide with ammonia but are not used for treatment of diesel exhaust.

Therefore, it is desirable to have a washcoat which provides improved adherence and reduced reaction with sulfur when used as a support for platinum or palladium.

SUMMARY OF THE INVENTION

In accordance with the invention, a washcoat layer for use as a support for catalytic metal is prepared by intermingling oxide particles of respectively, silica, vanadia, and titania. Preferably, clay particles and especially silicate-based clay particles are also included to enhance binding of the oxide particles together and to a monolith support member. A catalytically active metal, desirably of the platinum group, and preferably platinum, palladium or mixtures thereof, is dispersed on the intermingled oxide particles, and a major portion of the catalytically active metal is dispersed on the titania.

The washcoat of the invention is conveniently applied to gas contacting surfaces of a flow-through ceramic or metal catalytic converter (substrate) by applying a wet mixture of mixed oxide powders of silica, vanadia and titania, and then drying and calcining the applied mixture to form a substantially solid coating on the substrate. Preferably, the wet mixture includes a dispersant 95% 2-amino-2-methyl-1-propanol which enhances distribution of the oxide particles in the mixture and correspondingly in the solid coating.

After drying and calcining, the solid washcoat is impregnated with platinum or palladium. A metal salt of platinum or palladium is dissolved in solution, forming a negatively charged metal ion, such as $PtCl_6^{2-}$ which is preferentially attracted to positively charged titania oxide particles at a pH of about 3. This places the catalytic metal on titania rather than silica, thus minimizing undesired reaction with sulfur oxides which occur with silica supported metal catalyst.

The intermingled oxide powders, namely, silica, vanadia and titania, are in a proportion to one another based on 100 parts by weight of 25% to 60% silica, 25% to 60% titania in an anatase form, 1% to 10% anatase titania in a gel hydrate form, and 1% to 10% vanadia. In one embodiment, such intermingled oxides constitute about 95% of the weight of the solids in the coating and about 5 weight percent silica-based clay, preferably of montmorillonite, is included with the intermingled oxides. Preferably, the silica particles have an average or median particle size greater than the titania particles so that the titania remains exposed and not encompassed by silica. Preferably, the vanadia particles also have an average or median particle size greater than the titania. Preferably, a major portion of the catalytic metal is carried by the titania so as to improve activity and minimize degradation of catalytic activity as compared to what is seen on silica. The combination of silica and vanadia renders improved adherence, and the combination of silica and clay further improved adherence. Advantageously, the combination of silica, titania and vanadia provides a well-adhered coating having minimum reaction with sulfur and catalysis of other constituents, including condensable hydrocarbon.

Advantageously, the silica-titania-vanadia (STV) support of the invention when used with platinum (Pt) catalyst for light-duty vehicles for treatment of exhaust at temperatures up to about 350° C. to 400° C., and palladium (Pd) catalyst for light to mid-duty vehicles for treatment of exhaust up to about 600° C., prevents undesired reaction of sulfur oxides while permitting other constituents of diesel exhaust emissions to react with the catalyst. These suggested upper limits of temperature are given because of the current sulfur content of fuels and not to limit the method of the invention. These suggested temperatures are preferred to limit reaction of sulfur given the current sulfur content of fuels. The cracking and/or oxidation of the soluble organic portion of exhaust in the presence of the STV-supported catalytic metal reduces the portion available for deposition onto carbonaceous particles, thus reducing the amount of particulate. At the same time, the STV supported catalyst of the invention limits production of mutation-causing aromatic species.

Therefore, it is an object of the invention to provide a catalyst support which is suitable for treatment of diesel exhaust, which catalyzes cracking and/or oxidation of hydrocarbon, and particularly aromatic or cyclic hydrocarbons, which minimizes reaction of sulfur oxides ($SO_x$) and which is well adhered to a monolithic support member. Further objects are to provide a method of making the catalyst support and to provide a method for treating diesel exhaust using the new STV catalyst supports.

These and other objects, features and advantages will become apparent from the following description of the preferred embodiments, appended claims and accompanying drawings.

DETAILED DESCRIPTION OF THE PREFERRED EMBODIMENTS

Figure 1:
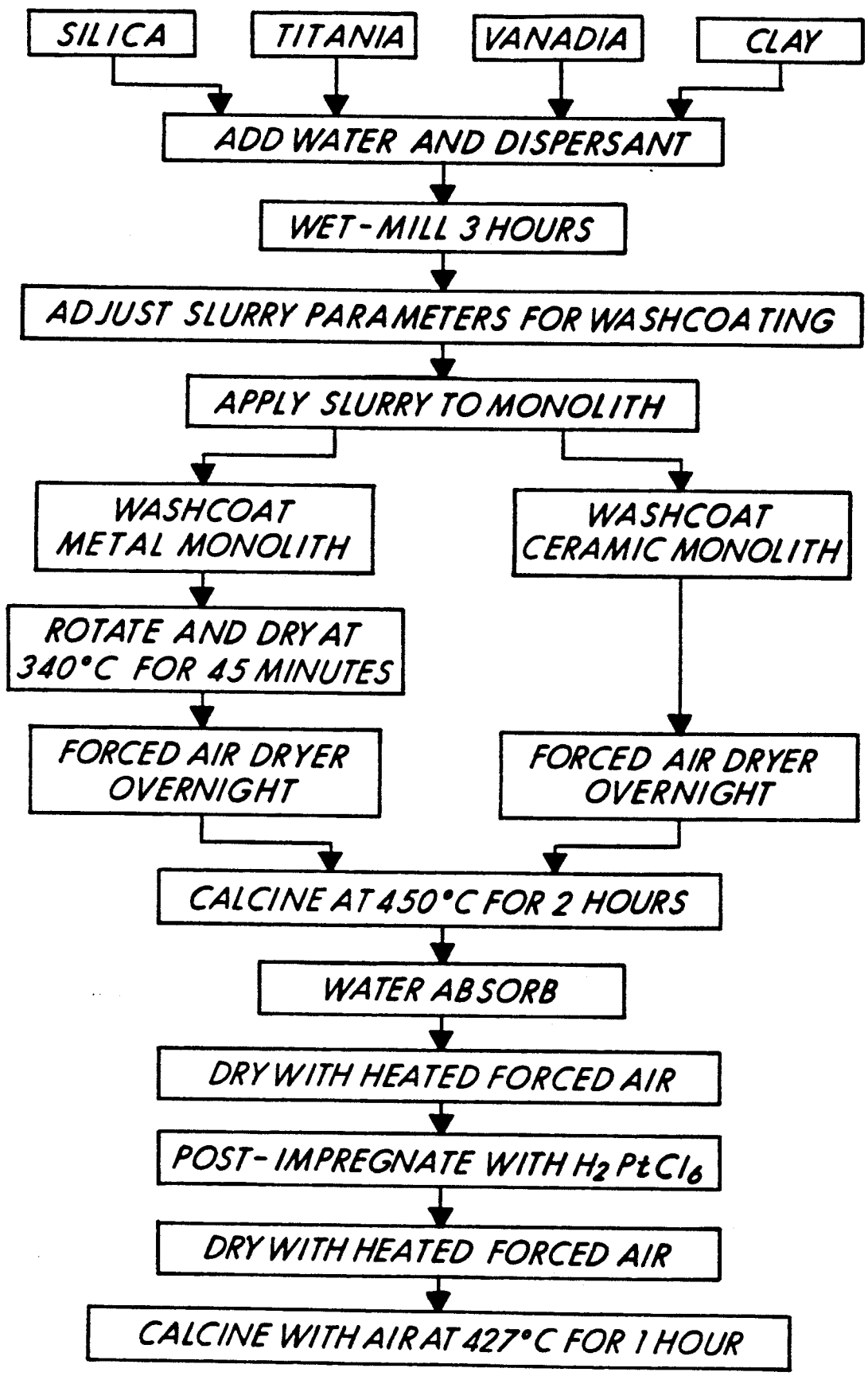
FIG. 1 is a flow diagram showing a preferred process of preparing washcoated monoliths.

A washcoat layer for use as a noble metal support contains intermingled oxide particles of, respectively, silica, vanadia and titania. Preferably, silicate-based clay particles are also included in the washcoat to enhance binding of the oxide particles together, one to a metal monolith support member. The catalytically active noble metal is dispersed on the intermingled particles. Desirably, the metal is from the platinum group e.g., platinum, palladium, rhodium or ruthenium and preferably is platinum, palladium or mixtures thereof. Preferably, a major portion of the catalytically active metal is dispersed on the titania.

The silica, vanadia and titania are in a proportion to one another based on 100 parts by weight of 25% to 60% silica, 25% to 60% titania in an anatase form, 1% to 10% anatase titania in a gel hydrate form, and 1% to 10% vanadia. When the silicate-based clay is included in a preferred mixture, the silica, vanadia and titania are within the ranges as described above, and the mixture further includes 1% to 10% by weight silicate-based clay, preferably of montmorillonite.

The washcoat of the invention is conveniently applied to gas contacting surfaces of a flow-through ceramic or metal catalytic converter (substrate) by applying a wet mixture of mixed oxide powders of silica, vanadia and titania and then drying and calcining the applied mixture to form a substantially solid coating on the substrate, and then the coating is impregnated with platinum or palladium.

The basic process, as shown in FIG. 1, begins with combining silica, vanadia and titania powders with water. Then, either bentonite or hectorite clay is added. In the case of bentonite, the clay may be added to the dry powders before water is added. In the case of hectorite, special processing is required as described below. Next, a dispersant, preferably 95% 2-amino-2-methyl-1-propanol in 5% water, is added to the wet mixture and then the wet mixture is comminuted preferably for three hours in a one gallon mill using three-eights inch diameter spherical grinding media. Comminution of the aqueous slurry breaks down agglomerates while simultaneously reducing particle size of the coarser vanadia component to stabilize the slurry. Preferably, the silica and vanadia particles retain their larger particle size relative to titania, both before and after ball milling.

It should be noted that the vanadia may be milled separately before forming the slurry of powders. Then, further milling of the combined wet powders and clay is optional.

Next, the viscosity and pH of the slurry are adjusted to facilitate application of the slurry to the catalytic converter. The slurry is adjusted to a viscosity between 10 cP and 700 cP with solids in the range of 10% to 60% by weight for coating the monolith, using a Brookfield LVT viscometer at 60 rpm using a #3 spindle. The monolith (flow-through catalytic converter) had exhaust gas contacting surfaces in the form of channels onto which the slurry was applied. The amount of slurry applied is not critical; however, extra slurry may plug passages of the monolith. The amount of slurry preferably provides a coating thickness of about 10 to 40 microns after drying and calcining. Immediately after application of the slurry, the channels of the monolith were blown out to prevent plugging and next dried in warm air at 340° C. for about 45 minutes. In order to prevent plugging of the cells, the monolith could be tumbled during drying. The dried monolith was then calcined at about 350° C. to 700° C. for about one-half hour to four hours.

As described in examples below, compositions were washcoated on metal monoliths having 85 cubic inches of volume based on outside dimensions and having 225 cells (passages) per square inch of cross section. The amount of coating applied to each such monolith averaged about 150 grams after calcination. Each of the monoliths were post-impregnated with chloroplatinic acid. A typical loading was 0.08 troy ounces (2.48 grams) of platinum. This corresponds to between 0.01 and 0.02 grams of precious metal per each gram of calcined washcoat. This also corresponded to about 50 grams per cubic foot per monolith using an incipient wetness technique, that is, based upon how much water the monolith soaked up.

More specifically, acidic chloroplatinic acid ($H_2PtCl_6*6H_2O$) was used to post-impregnate the catalyst in a preferred incipient wetness technique. The negative $PtCl_6^{2-}$ radical was attracted preferentially to the titania particles which wer positively charged at an impregnation pH of about 3. Little or no attraction existed between the $PtCl_6^{2-}$ radical and the negatively charged silica and vanadia particles. After impregnation, another calcination was conducted at temperatures between 400° C. and 700° C. with air to remove all moisture and organics. A reducing atmosphere was used in some cases but was not required. It will be appreciated that in another preferred embodiment, the noble metal precursor compound, regardless of ionic charge, could be applied to the titania particulate constituent before the titania, silica and vanadia are wet mixed. In this embodiment, no post-impregnation of a calcined washcoat would be required.

Best results were achieved using powders having specific characteristics. A high surface area (400 $m^2$/gram to 600 $m^2$/gram) silica powder (Rhone Poulenc, RP 540GM) with a median particle size of 14.8 microns acted as a coarse component of the washcoat. Preferred, finer titania particles provided the majority of the support for platinum. Two anatase titanias were used. One anatase titania was a powder, Rhone Poulenc, RP DT-51 having a median particle size of about 1.0 micron and a surface area of about 80 to about 100 $m^2$/grams. The other anatase was a hydrate, Rhone Poulenc, RP G3 Gel, which had a median particle size of 1.0 micron and a surface area greater than 250 m²/gram. A coarse vanadia acquired from Fisher Scientific Company was rated as a 95% pure material and had a particle size of about 110 microns and a surface area of about 5.1 m²/gram. The preferred clay was bentonite, which is a hydrous aluminum silicate montmorillonite clay (Volclay HPM-20 American Colloid Company) consisting of fine particles. As stated earlier, the clay aided in binding the silica, titania and vanadia particles together and improved adherence to a monolith.

It should be noted that median particle size refers to that size at which 50% by weight of the particles are above and below in size, respectively.

EXAMPLE 1—(DT-S-B4:STV-Pt)

Titania, silica and vanadia powders were combined in a wet slurry in proportions described below. Denser titania powders (3.8 grams/cm³) required particle size reduction of agglomerates to stabilize suspension in a slurry. Three hours of wet milling in a Nalgene brand one gallon mil was used to suspend the titania particles (FIG. 1). A 2-amino-2-methyl-1-propanol pH stabilizer sold as AMP-95 by Angus Chemical Company was incorporated into the slurries to facilitate dispersion of titania particles. Batch milling for a period of about three hours was found to be sufficient to essentially thoroughly distribute the intermingled particles. Without dispersant, the fine, high surface area titania powders' attractive forces kept solid percents below 35% and working viscosities above 400 cP. The respective particle sizes of the silica, titania and vanadia powders combined provided a wide particle size distribution which enhanced adherence to a metal monolith.

In order to further enhance adherence, a bentonite clay was included in the wet slurry as an inorganic binder for improving coating adherence to a metal surface. Bentonite, a hydrous aluminum silicate clay, was added directly to the wet slurry and milled with the rest of the powders. Bentonite was purchased from American Colloid Company under the designation Volclay HPM-20. Volclay is an aluminum silicate clay having about 60 weight percent silica, 20 weight percent alumina and the balance other oxides. The weight proportions of the powders of this slurry were as follows: 5% anatase gel titania, 45% anatase titania powder, 40% silica powder, 5% vanadia powder, and 5% bentonite clay. Monoliths prepared using this slurry are designated DT-S-B4 for test purposes. The slurries were applied both to metal monoliths and to metal coupons manually dip coated with the slurry. Qualitative evaluation of coating loss was conducted on uncorrugated oxidized metal foil taken from production line monolith material and cut into coupons. The coupons were dipped in slurry and flipped after air drying or after calcining at 450° C. for about two hours. Before and after thermal cycling, the coatings showed very good adherence, that is, as good as or better than comparative coatings such as silica. Washcoated metal monoliths were impregnated using a chloroplatinic acid.

EXAMPLE 2—(DT-S-H4:STV-Pt)

The method of Example 1 was followed except that a hectorite clay was evaluated as the inorganic binder. The hectorite clay was obtained from American Colloid Company and is a magnesium-aluminum-silicate clay having a composition of about 60 weight percent silica, 25 weight percent magnesium oxide, and the balance various other oxides.

As in Example 1, the clay constituted about 5 weight percent of the solids in the slurry, and the balance of the solids comprised about 5 weight percent titania hydrate gel, 45 weight percent anatase titania powder, 40 percent silica, and 5 percent vanadia. Hectorite clay was not directly added to the wet mixture of powders; rather, the hectorite was added to boiling water, mixed for an hour at a high sheer rate, and then the aqueous hectorite mixture was combined with the oxide powders in the mill for wet milling. Monoliths prepared using this slurry were designated as DT-S-H4 for test purposes.

EXAMPLE 3—(STV-Pd)

The method of Example 1 was used to prepare a catalyzed washcoat support of STV with palladium (Pd). Washcoated metal monoliths were impregnated with palladium chloride ions in solution.

An evaluation matrix was constructed to evaluate three factors, namely, variable vanadia content, variable silica content, and type of binder for coating sample numbers 1–8 (STV-Pt) (Table 1). Odd numbered samples were prepared by the basic method of Example 1 and even numbered samples were prepared by the method of Example 2. In this evaluation, the amount of binder was held constant at 5 weight percent and the amount of titania was equal to 100 weight percent minus the sum of binder, vanadia, and silica weight percent as shown in Table 1. In all cases, the ratio of the gel titania to the powder titania was held at 1:9. Each of the coatings had a milling time of three hours in one quart mills with calculated solid content at 45 percent. Coupons were prepared by dip coating at a coating viscosity of 300 cP and then calcined at a temperature of about 450° C. The coated metal coupons were evaluated for adherence (green and calcined), sulfur storage, surface area, pH, solids percent at a viscosity of 300 cP, and slurry stability. Thermal gravimetric analysis (TGA) was used to determine sulfur storage at 450° C. with sulfur dioxide in air compared to a sample in a nitrogen atmosphere. A Coulter-type particle size analyzer was used to evaluate the particle size distributions of the mixed oxidized compositions. Adherence of the green DT-S-B4 (bentonite clay coating) and the DT-S-H4 (hectorite coating) are shown in Table 1 along with adherence after calcining. Adherence, surface areas, pH, and sulfur storage characteristic of all eight samples are very good to excellent.

The factors affecting adherence were further analyzed to optimize adhesion of the high surface area STV washcoats, and the results are as shown in Table 2. The silica content had a significant effect on the calcined adherence, but surprisingly was not a critical factor affecting green adherence as noted in Table 2. Adhesion of the washcoat when green was dependant upon the vanadia/binder interaction. Calcined washcoats were not significantly affected by the vanadia/binder interaction, but instead were dependant upon silica and vanadia content along with the interaction between the silica and the clay binder.

Selection of either clay binder was not a major factor affecting adhesion of green or calcined washcoats as shown in Tables 1 and 2. If required, the clays could be used interchangeably. The Volclay HPM-20 bentonite clay is favored over the hectorite clay because it is cheaper, does not require as much processing, and only picks up about half the water that hectorite does.

TABLE 1

| Sample Number | Vanadia Content | Silica Content | Adherence for Green Coatings | Adherence after Calcining (450° C./2 hrs) | Slurry pH | Slurry Solids % | Surface Area (m²/g) | Sulfur Storage Data |
|---|---|---|---|---|---|---|---|---|
| 1 | 2% | 25% | 99.72 | 97.00 | 8.3 | 41.9% | 174.6 | 0.28 wt % |
| 2 | 2% | 25% | 97.48 | 97.42 | 8.3 | 42.8% | 164.2 | 0.61 wt % |
| 3 | 2% | 60% | 99.75 | 99.61 | 6.9 | 37.7% | 266.8 | 0.53 wt % |
| 4 | 2% | 60% | 98.87 | 99.02 | 6.7 | 37.3% | 276.0 | 0.34 wt % |
| 5 | 4% | 25% | 98.57 | 97.89 | 7.7 | 40.6% | 173.0 | 0.42 wt % |
| 6 | 4% | 25% | 100.00 | 100.00 | 7.5 | 44.5% | 167.9 | 0.61 wt % |
| 7 | 4% | 60% | 99.75 | 100.00 | 5.0 | 38.2% | 324.3 | 0.31 wt % |
| 8 | 4% | 60% | 100.00 | 99.50 | 5.9 | 40.1% | 302.7 | 0.37 wt % |

Note:
1. Vanadia and silica contents are based on 100 weight percent of solid mixture which also contains 5% binder and the balance essentially titania.
2. Titania is present as a mixture of gel and powder in a ratio of 1:9.
3. Samples 1, 3, 5, and 7 contain bentonite clay.
4. Samples 2, 4, 6, and 8 contain hectorite clay.
5. Surface area after calcination at 450° C. for 2 hours.

TABLE 2

Significance of Factors

| Factor | Green Adherence | Calcined Adherence (450° C., 2 hrs) | Surface Area |
|---|---|---|---|
| $V_2O_5$ | no | yes | yes |
| $SiO_2$ | no | yes | yes |
| $V_2O_5$—$SiO_2$ | no | yes | yes |
| Binder | no | no | no |
| $V_2O_5$-binder | yes | no | no |
| $SiO_2$-binder | no | yes | no |
| $V_2O_5$—$SiO_2$-binder | — | — | — |

Coarsening the slurry tended to promote better adhesion of the washcoat to the metal coupons. Coating sample #7, consisting of 60% Rhone Poulenc 540GM silica on a weight basis, 4% vanadia, 5% Volclay HPM-20 bentonite clay, and the remaining portion titania, had the best adherence in both green and calcined states. The confirmation run correlated with the initial test results.

Both washcoating parameters, percent of solids and pH, were lowered for each slurry as silica content and vanadia content were increased with results shown in Table 1. In aqueous solutions with 25% solids of either silica or vanadia, a pH range of 2 to 5 is measured. This would explain the increase in acidity. Along with acidity, the addition of more Rhone Poulenc 540GM silica to a washcoat increased surface area while the effect of vanadia additions were negligible. As expected, the increases in surface area resulted in a drop of solids content at the targeted coating viscosity.

Calcined powders (450° C., two hours) without a noble metal catalyst submitted to TGA sulfur storage evaluation were found to store less sulfur than alumina ($SO_2$ storage: 1.5 weight percent). Varying from 0.61 weight percent to 0.28 weight percent for sulfur storage (Table 1), the statistically optimum formulation for low sulfur storage was sample #7 (DT-S-B4). In general, formulations containing bentonite clay stored less sulfur than formulations containing hectorite clay.

Using x-ray diffraction and fluorescence techniques, it was determined that the silica-titania-vanadia (STV) formulation of Example 1 was crystallographically stable after extreme thermal conditioning (relevant to diesel applications). A small amount of crystallographic conversion was detectable after 100 hours of thermal conditioning at 600° C. This included the conversion of some amorphous silica to a crystalline form, cristobalite, and of a trace amount of anatase titania to rutile titania.

Selected dip-coated coupons were evaluated on a Jeol JSM T-300 Scanning Electron Microscope (SEM). Particle packing and distribution were found to be irregular. The fine titania particles had the tendency to flocculate around the silica and vanadia particles. The fine titania particles did not completely cover the Rhone Poulenc 540GM silica. This irregular packing of the STV washcoat is held together in part by the clay binder.

TABLE 3

|  | Titania | | | | Silica | | Clay | |
|---|---|---|---|---|---|---|---|---|
|  | Degussa P-25 | Kronos 1000 | R/P G3 Gel | R/P DT-51 | R/P 540 | Vanadia Vanadia | Volclay HPM-20 | Hectalite |
| STV-Washcoats | | | | | | | | |
| DT-S-B1 | 5% | 45% | — | — | 15% | 5% | 5% | — |
| DT-S-B4 | — | — | 5% | 45% | 40% | 5% | 5% | — |
| DT-S-H2 | — | — | 8% | 45% | 40% | 5% | — | 2% |
| DT-S-H3 | — | 45% | 8% | — | 40% | 4% | — | 3% |
| DT-S-H4 | — | — | 5% | 45% | 40% | 5% | — | 5% |
| Comparative Washcoats | | | | | | | | |
| DT-S-B2 | 5% | 50% | — | — | 40% | 0 | 5% | — |
| DT-S-B3 | — | — | 5% | 50% | 40% | — | 5% | — |

TABLE 4

| | Titania | | | | Silica | Clay | | |
|---|---|---|---|---|---|---|---|---|
| | Degussa P-25 | Kronos 1000 | R/P G3 Gel | R/P DT-51 | R/P 540GM | Volclay HPM-20 | Hectalite GM | Vanadia |
| Median Particle Size (microns) | (0.02) | 0.27 | 1.0 | 1.0 | 14.8 | — | — | 110 |
| Surface Area (as received) | 51.9 | 10.0 | 322.7 | 107.7 | 691.3 | 42.5 | 64.0 | 5.1 |
| Surface Area (450° C./2 hrs) ($m^2/g$) | 50.1 | 9.3 | 196.4 | 84.3 | 474.1 | 32.8 | 69.4 | 3.1 |
| Surface Area (400° C./100 hrs) ($m^2/g$) | 45.9 | — | 179.8 | 87.1 | 399.5 | 35.3 | 64.0 | — |
| Isoelectric Point | 7.8 | — | 5.4 | 6.4 | — | — | — | NONE |

( ) - Data supplied by vendor

Other coatings were prepared by the method of Example 1 but using different titania powders and by varying the weight percentages of clay and powders in the formulation. Shown in Table 3, the DT-S-B4 and DT-S-H4 of Examples 1 and 2 provide the best adherence. The properties of all powders tested are given in Table 4. Of the four titanias tested, the combination of R/P G3 Gel and R/P DT-51 powder titania, as used in Examples 1 and 2, was preferred.

Testing and Comparison of Coated Monolithic Converters

Before testing, each of the prepared M85 metal monolith converters of Examples 1 and 2 (DT-S-B4 and DT-S-H4) were aged on a 6.2 L, V-8 diesel engine dynamometer for 24 hours according to a preset simulated driving schedule, which is an AMA Schedule. The catalyst converter test facility consisted of the dynamometer controlled engine, a gas flow control system, emissions analysis and a computer interface. In the simulation, catalysts were aged while exposed to exhaust while engine operation was varied according to the schedule, under controlled conditions.

After aging, the catalysts were evaluated under transient test conditions using the U.S. Federal Test Procedure (FTP). The tests were started with the engine hot. A 1989 Opel Omega 2.3 LD and a 1989 Opel Vectra 1.7 ID were used as exhaust gas sources. The Omega 2.3 LD operated within the temperature range of 100° C. to 350° C. The Vectra 1.7 ID operated at higher temperatures than the Omega 2.3 LD. Exhaust emissions were within the temperature range of 100° C. to 400° C. at the inlet to the monolith. The Omega had a modal temperature of 100° C. and the Vectra, 150° C. The modal temperature is experienced most of the time.

During the tests, the inlet temperature of the exhaust to each converter was controlled by fine tuning the throttle opening and the back pressure valve downstream of the converter. Test conditions for particulate conversion were measured at the temperatures given for the Omega and Vectra. Samples were drawn from the inlet and the outlet of the converter. The particulate was collected on filters. The weights of the filters prior to and after the particulate collection were measured to calculate the weight of the particulate collected. The efficiency is the difference in particulate weight collected at the outlet of a straight pipe and a converter. This difference is divided by the straight pipe particulate weight and multiplied by one hundred to obtain particulate efficiency.

TABLE 5

| Exhaust Source | Substrate Type | HC Efficiency | CO Efficiency | Particulate Efficiency | Mutagen Reduction |
|---|---|---|---|---|---|
| I. Results for Fresh Catalyst | | | | | |
| Example 1 - STV supported Pt catalyst with bentonite | | | | | |
| DT-S-B4 Omega 2.3 LD | metal | 36% | 32% | 28% | 45% |
| DT-S-B4 Vectra 1.7 ID | metal | 56% | 74% | 44% | — |
| Example 2 - STV supported Pt catalyst with hectorite | | | | | |
| DT-S-H4 Omega 2.3 LD | metal | 42% | 31% | 22% | 45% |
| Example 3 - STV supported Pd catalyst with bentonite | | | | | |
| Vectra 1.7 ID | metal | 39% | 15% | 41% | — |
| Comparative Catalyst - Silica supported Pd catalyst | | | | | |
| Omega 2.3 LD | metal | −10% | −4% | 22% | −50% |
| Vectra 1.7 ID | metal | 15% | −2% | 32% | — |
| Comparative Catalyst - $ZrO_2/Al_2O_3$ supported Pt | | | | | |
| Omega 2.3 LD | metal | 16% | 15% | 34% | −50% |
| II. Results for Aged Catalyst | | | | | |
| Example 1 - STV Supported Pt with bentonite | | | | | |
| DT-S-B4 Vectra 1.7 ID | metal | 50% | 52% | 39% | — |
| Comparative Catalyst - Alumina/Titania/Vanadia Supported Pt catalyst (DC530) | | | | | |
| Omega 2.3 LD | metal | 22% | 35% | 26% | 40% |
| Omega 2.3 LD | metal | 14% | 32% | 25% | 40% |

TABLE 5-continued

| Exhaust Source | Substrate Type | HC Efficiency | CO Efficiency | Particulate Efficiency | Mutagen Reduction |
|---|---|---|---|---|---|
| Comparative Catalyst - Al$_2$O$_3$ supported Pt | | | | | |
| Omega 2.3 LD | metal | 21% | 20% | 25% | −50% |

Note:
1. Test results after aging 24 hours and considered "Fresh".
2. Test results after rapid aging 100 hours to simulate 50,000 miles and considered "Aged".
3. STV denotes support formed of mixed oxide powders of silica, titania, and vanadia.
4. All noble metal loadings at 50 grams per cubic foot of total monolith volume equivalent to about 0.01 to 0.02 grams precious metal per gram of calcined washcoat.

Transient testing showed that the silica-titania-vanadia (STV) supported platinum catalyst significantly reduced gaseous (hydrocarbons and CO) and particulate emissions as seen in Table 5, which compares the STV catalyst with a current composition of silica supported palladium catalyst (Pd/SiO$_2$). A silica coated with TiO$_2$ and V$_2$O$_5$ was also tested as a support for Pt; however, this was not a support of intermingled oxide powders. It did not perform as well as the STV-Pt catalyst of the invention, and it created significant mutagens.

The relatively high particulate efficiencies of the catalysts of Examples 1 and 2 (STV-Pt) result from cracking and/or oxidation of hydrocarbon, which reduces the weight of hydrocarbon particulate between inlet and outlet. At the same time, the catalysts of Examples 1 and 2 minimized reaction of sulfur oxides, so sulfur compounds are not accumulated on the outlet filter. This was further demonstrated by comparing the sulfur uptake characteristics of titania and silica powders alone and in combination as STV of the invention. When tested for 12.5 hours at 450° C. in a stream of air containing 65 ppm SO$_2$, the STV catalyst support of the invention gained less than 0.1 weight percent sulfur, whereas the silica gained between 0.25 and 0.5 and titania gel gained 1.0 to 1.5 weight percent sulfur. A commercial alumina-titania-vanadia catalyst support gained between 1.25 and 1.5 weight percent sulfur. Advantageously, the STV-Pt and STV-Pd catalysts gained only about 0.4% and 0.7% sulfur, respectively.

The improved performance of the intermingled STV oxide catalyst support of the invention, as compared to other catalysts, may be due to the use of titania in a powder form as a major portion of the support. This permits catalytic metal to be selectively deposited on titania support particles. As stated earlier, chloroplatinic acid (H$_2$PtCl$_6$) was used to post-impregnate the DT-S-B4 and DT-S-H4 (STV) washcoats of Examples 1 and 2 to take advantage of surface charge. The titania particles had a positive surface charge in the acidic environment of the chloroplatinic acid as determined by ESA measurements (Electro Kinetic Sonic Amplification). Silica and vanadia maintained a negative surface charge in the pH range of 2 to 10. By post-impregnating with chloroplatinic acid, the negative platinum radical (PtCl$_6^{2-}$) was attracted to the surface of the titania. This placed the catalyst on a titania particle with a large number of Lewis acid sites and tended to keep the platinum off the surface of the silica. This was confirmed by testing the amount of Pt radical uptake using equivalent weights of calcined silica and titania. The STV catalyst support system effectively reduced gaseous emissions and remained insensitive to SO$_x$ poisoning or deactivation, as shown by comparative tests.

Mutation causing species, many of which are nitrated polycyclic aromatic hydrocarbons (NPAH), are formed from aromatic hydrocarbons at temperatures similar to that of light-duty diesel exhaust. Such mutagen species are suspected of being carcinogenic. The STV-Pt catalyst was designed, in part, to reduce the amount of aromatic hydrocarbon in the exhaust to thereby prevent formation of NPAHs. Table 5 summarizes the mutagen reduction character of the STV-Pt catalyst as compared to a silica supported palladium catalyst (SiO$_2$/Pd) and a commercial (Al-Ti-V) supported platinum catalyst. Evaluation consisted of collecting particulate samples from the 1989 Opel Omega 2.3 LD on Teflon filters. Solvent extracts were prepared from the filter samples and then evaluated for activity in a bacterial mutation assay. The negative value (−50%) shown for SiO$_2$/Pd indicates that mutagens were increased by the catalyst, whereas the STV-Pt catalyst of the invention decreased mutagens by 40%. It should be noted that although the SiO$_2$/Pd catalyst reduced particulate, it increased mutagens (NPAH). In contrast, the STV-Pt catalyst of the invention decreased both particulate and mutagens.

The STV-Pt catalysts of the invention were tested against other Pt supported catalyst, namely, Pt supported on, respectively, Al$_2$O$_3$, ZrO$_2$/Al$_2$O$_3$ and Al$_2$O$_3$/TiO$_2$/V$_2$O$_5$ to determine performance, and particularly mutagen production. All such comparative Pt supported catalyst demonstrated greater mutagen production than STV-Pt. The STV-Pd catalysts of the invention demonstrated catalytic activity for particulates comparable to the STV-Pt catalyst. Catalytic activity of STV-Pd for hydrocarbon was better than the common silica used to support Pd. In summary, the catalytic support consisting of silica-titania-vanadia in combination with platinum demonstrated excellent particulate and gaseous efficiencies on light-duty diesel vehicles. The STV-Pt catalyst has a relatively low affinity for sulfur oxides and thus remains relatively immune to SO$_x$ poisoning or deactivation which occurs when platinum is deposited on silica and other supports. Since undesired reaction of SO$_x$ has been the largest obstacle to overcome with platinum catalyst on diesel vehicles, the STV catalyst support provides a unique advantage. The STV-Pt catalyst demonstrated excellent catalytic activity for constituents of exhaust other than sulfur while limiting the production of mutation-causing species, many of which are nitrated polycyclic aromatic hydrocarbons (NPAHs). Initial evaluations of STV-palladium have also been favorable. STV-palladium catalyst is applicable to light- and mid-duty diesel applications.

While this invention has been described in terms of certain embodiments thereof, it is not intended that it be limited to the above description but rather only to the extent set forth in the following claims.

The embodiments of the invention in which an exclusive property or privilege is claimed are defined as follows.

1. A method of making a washcoat mixture for treatment of exhaust emission from diesel engines, comprising:
   a) forming a wet mixture comprising fine particles of, respectively, silica, titania, vanadia, and a silicate-based clay, a major portion of the silica particles having a median size greater than the median size of the titania particles;
   b) wet milling the mixture to obtain a slurry of desired consistency and having the particles intermingled; and
   c) applying the slurry as a coating to a monolithic support substrate.

2. The method according to claim 1 further including drying and calcining the slurry-coated substrate to form a substantially solid and adherent washcoat layer of the particles, and then impregnating the washcoat layer with a solution containing a diesel exhaust gas catalytic metal.

3. The method according to claim 2 further including calcining the impregnated washcoat layer.

4. The method according to claim 1 wherein the wet mixture includes a catalytic material of at least one selected from the group consisting of platinum, palladium, rhodium and ruthenium.

5. The method according to claim 1 wherein the fine particles of titania are precoated with at least one noble metal from the group consisting of platinum, palladium, rhodium and ruthenium.

6. The method according to claim 1 wherein the wet mixture further includes 2-amino-2-methyl-1-propanol in an amount sufficient to essentially uniformly distribute the particles in the slurry.

7. A catalyst for treatment of exhaust emissions from diesel engines comprising a support substrate carrying a catalytically active washcoat layer, the catalytically active washcoat layer consisting essentially of intermingled fine particles of, respectively, silica, titania, vanadia, and a silicate-based clay, and very fine particles of catalytically active metal selected from the group consisting of platinum, palladium, rhodium, ruthenium and mixtures thereof, dispersed on the intermingled particles, at least a portion of the dispersed metal being supported by the titania.

8. A catalyst according to claim 7 wherein all the dispersed metal is supported by the titania.

9. The catalyst according to claim 7 wherein the silica particles have a median size greater than the median size of the titania particles.

10. A catalyst for treatment of exhaust emissions from diesel engines comprising a support substrate carrying a catalytically active washcoat layer, the catalytically active washcoat layer comprising:
    intermingled fine particles of, respectively, silica, titania, vanadia, and a silicate-based clay in a proportion to one another based on 100 parts by weight of about 25% to about 60% silica, about 25% to about 60% titania, vanadia in an amount of about 1% to about 10%, and 1% to 10% silicate-based clay, and
    catalytically active metal selected from the group consisting of platinum, palladium, rhodium, ruthenium and mixtures thereof, dispersed on the intermingled particles, at least a portion of the dispersed metal being supported by the titania.

11. A catalyst according to claim 10 wherein all the dispersed metal is supported by the titania.

12. The catalyst according to claim 10 wherein the silica particles have a median size greater than the median size of the titania particles.

* * * * *